UNITED STATES PATENT OFFICE.

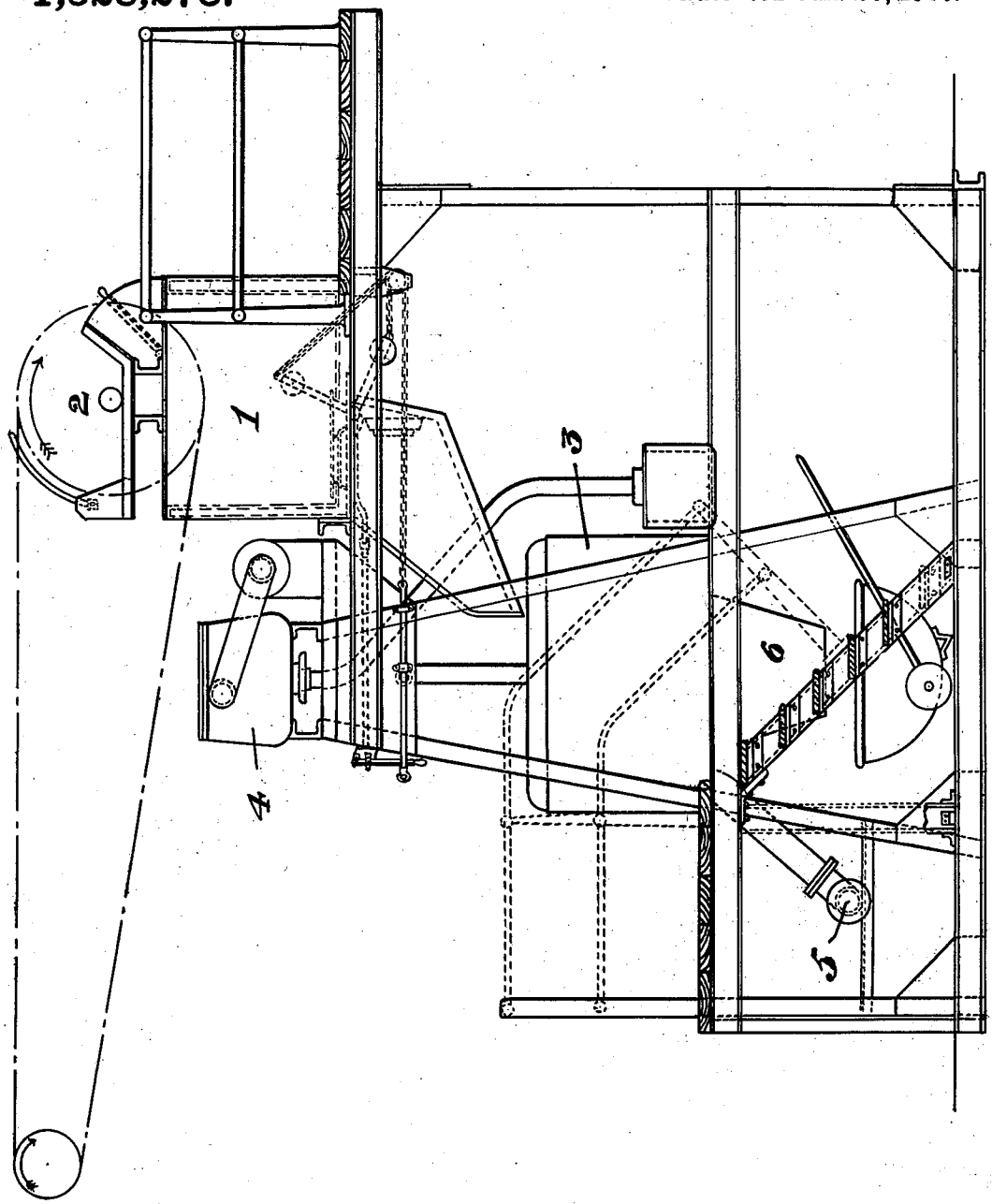

NORMAN ALEXANDER GAVIN, OF KINSHASHA, BELGIAN KONGO; MARY MACDONALD GAVIN, EXECUTRIX OF SAID NORMAN ALEXANDER GAVIN, DECEASED, ASSIGNOR TO LEVER BROTHERS LIMITED, OF PORT SUNLIGHT, ENGLAND.

EXTRACTION OF OIL FROM VEGETABLE FRUITS.

1,328,278.     Specification of Letters Patent.     Patented Jan. 20, 1920.

Application filed March 3, 1917. Serial No. 152,347.

*To all whom it may concern:*

Be it known that I, NORMAN ALEXANDER GAVIN, a subject of the King of Great Britain, residing at Kinshasha, Belgian Kongo, have invented certain new and useful Improvements in the Extraction of Oil from Vegetable Fruits, of which the following is a specification.

The present invention relates to improvements in the extraction of oil from fruits, particularly nuts, such as nuts producing palm oil and the like (*Elæis Guineensis; Elæis melanococca*, etc.).

According to the present invention the oil is extracted from the pericarp of nuts of this nature by submitting the fruit to the action of a spinning extractor such as a centrifugal in contradistinction to pressing as in known processes.

The invention is more particularly described with reference to the accompanying drawing.

In the process of the present invention it is preferred to use jacketed kettles 1 of the known type having rotating arms driven by bevel gearing from the shaft 2 although this machine may be slightly modified in certain particulars if found desirable. The fruit, immediately after cooking, is then transferred to a centrifugal extractor 3 which may be of known type, driven by a water motor 4, but it has been found desirable to design the internal linings of the same and the conditions as regards speed of revolution depending upon the kind of fruit acted upon and its condition. The oil is delivered by a pipe 5.

The extraction by the process of the present invention is found to allow of a free flow of oil from the treated fruit and to overcome the previous disadvantage of the breaking of the nuts. Further, the amount of oil so expelled in certain qualities of fruit practically represents the whole of the mechanically recoverable palm oil in the fruit.

If desired, where owing to the condition of the fruit before treatment by cooking or the like, or by conditions arising in such treatment, only a partial recovery of the oil is effected by the centrifugal extractor, the mat of combined fiber and nuts passing from the centrifugal through the chute 6 can then be screened, whereupon the fiber can be finally pressed for the extraction of the remaining oil. It is preferred that in such cases the mat of combined fiber and nuts should pass through a breaker previous to the screening. The nuts obtained as a residue from the above process can be further utilized in the usual manner.

I claim as my invention:—

1. A process of extraction of oil from the pericarp of palm oil and the like nuts consisting in cooking the nuts, passing them into a centrifugal to be subjected to centrifugal force, breaking the resultant mass, screening the mat of fiber and nuts so formed, and then pressing the fiber.

2. A process of extraction of oil from the pericarp of palm oil and the like nuts consisting in cooking the fruit, stirring the fruit while cooking, then subjecting the fruit to the action of centrifugal force in a centrifugal, breaking the resultant mass, then screening the resultant mat of fiber and nuts and then pressing the fiber.

In witness whereof I have hereunto signed my name this 28 day of December, 1916, in the presence of two subscribing witnesses.

NORMAN ALEXANDER GAVIN.

Witnesses:
KATHERINE LILIAN ANDERSON.
WM. HEDON COMMON.